United States Patent
Takahashi et al.

(10) Patent No.: US 9,677,414 B2
(45) Date of Patent: Jun. 13, 2017

(54) WASTE HEAT POWER GENERATOR

(75) Inventors: Toshio Takahashi, Tokyo (JP); Hirohisa Wakisaka, Tokyo (JP); Kouichi Machida, Tokyo (JP)

(73) Assignee: IHI CORPORATION (JP)

( * ) Notice: Subject to any disclaimer, the term of this patent is extended or adjusted under 35 U.S.C. 154(b) by 132 days.

(21) Appl. No.: 14/125,339

(22) PCT Filed: Jun. 19, 2012

(86) PCT No.: PCT/JP2012/065613
§ 371 (c)(1),
(2), (4) Date: Dec. 11, 2013

(87) PCT Pub. No.: WO2013/002066
PCT Pub. Date: Jan. 3, 2013

(65) Prior Publication Data
US 2014/0110939 A1    Apr. 24, 2014

(30) Foreign Application Priority Data

Jun. 27, 2011  (JP) .................. 2011-142095

(51) Int. Cl.
*F01K 27/02* (2006.01)
*F01K 13/00* (2006.01)
(Continued)

(52) U.S. Cl.
CPC ............. *F01D 15/10* (2013.01); *F01D 25/12* (2013.01); *F01K 9/003* (2013.01); *F01K 13/006* (2013.01);
(Continued)

(58) Field of Classification Search
CPC ........ F01K 27/02; F01K 13/006; F01K 9/003; F01K 17/02; F01D 25/12; F01D 15/10; F02C 7/16
See application file for complete search history.

(56) References Cited

U.S. PATENT DOCUMENTS 2,934,655 A * 4/1960 Heller .................. F01K 27/02
290/2
4,262,485 A * 4/1981 Kuroda et al. ................ 60/669
(Continued)

FOREIGN PATENT DOCUMENTS

CN         1044515 A     8/1990
CN       101260816 A     9/2008
(Continued)

OTHER PUBLICATIONS

Chinese Office Action dated Nov. 24, 2014 in corresponding Chinese Patent Application No. 201280030612.4 with Search Report (7 pages).
(Continued)

*Primary Examiner* — Mark Laurenzi
*Assistant Examiner* — Wesley Harris
(74) *Attorney, Agent, or Firm* — Ostrolenk Faber LLP

(57) ABSTRACT

A waste heat power generator (G1, G2) that includes an evaporator (1) to produce steam of a working medium, a power-generating device to generate electric power while expanding the steam, a condenser (3) to condense the steam which has passed through the power-generating device (2), and a pump (5) to send the condensed working medium to the evaporator (1). The waste heat power generator (G1, G2) may further include a valve device (6) to selectively supply a cooling medium used to cool the power-generating device (2) to the power-generating device (2), and a controller (7) to control the valve device (6) based on the temperature of the power-generating device (2).

9 Claims, 6 Drawing Sheets

(51) Int. Cl.
*F01K 9/00* (2006.01)
*F01K 17/02* (2006.01)
*F01D 25/12* (2006.01)
*F02C 7/16* (2006.01)
*F01D 15/10* (2006.01)
*F01K 13/02* (2006.01)
*F01K 25/08* (2006.01)

(52) U.S. Cl.
CPC .............. *F01K 13/02* (2013.01); *F01K 17/02* (2013.01); *F01K 25/08* (2013.01); *F01K 27/02* (2013.01); *F02C 7/16* (2013.01); *F05D 2220/31* (2013.01); *F05D 2220/62* (2013.01)

(56) References Cited

U.S. PATENT DOCUMENTS

| | | | |
|---|---|---|---|
| 5,172,553 A * | 12/1992 | Barton et al. | 60/656 |
| 5,490,386 A | 2/1996 | Keller et al. | |
| 2004/0098966 A1 * | 5/2004 | Dewis | 60/39.511 |
| 2005/0183421 A1 * | 8/2005 | Vaynberg | F01K 25/08 60/641.8 |
| 2009/0071156 A1 * | 3/2009 | Nishikawa et al. | 60/660 |
| 2012/0272648 A1 * | 11/2012 | Ast | F01K 13/00 60/645 |

FOREIGN PATENT DOCUMENTS

| | | |
|---|---|---|
| DE | 4129518 A1 | 3/1993 |
| EP | 1674669 A1 | 6/2006 |
| JP | 61-079808 | 4/1986 |
| JP | 09-317405 | 12/1997 |
| JP | 2000-110514 | 4/2000 |
| JP | 2002-516946 | 6/2002 |
| JP | 4286062 | 6/2009 |

OTHER PUBLICATIONS

International Search Report and Written Opinion mailed Sep. 4, 2012 in corresponding PCT International Application No. PCT/JP2012/065613.

* cited by examiner

WASTE HEAT POWER GENERATOR

CROSS-REFERENCE TO RELATED APPLICATIONS

The present application is a 35 U.S.C. §§371 national phase conversion of PCT/JP2012/065613, filed Jun. 19, 2012, which claims priority to Japanese Patent Application No. 2011-142095, filed Jun. 27, 2011, the contents of which are incorporated herein by reference. The PCT International Application was published in the Japanese language.

TECHNICAL FIELD

The present invention relates to a waste heat power generator which generates electric power using waste heat energy.

BACKGROUND ART

Conventionally, waste heat energy released from a factory, an incineration facility, or the like is recovered so as to perform electric power generation. The electric energy obtained from the electric power generation is reused, and thereby energy saving is advanced. In such a factory or a facility, the waste heat of about 300° C. or more (near 1000° C. in some cases) is used for the electric power generation, because high-pressure steam used to drive a power generator can be easily produced. On the other hand, much of the low-temperature waste heat of about 300° C. or less is still released into the atmosphere. Therefore, if the waste heat energy of the low-temperature waste heat which is not recovered in most cases in the related art is recovered to perform the electric power generation, a further energy reduction may be achieved.

Patent Document 1 shown below discloses a waste heat power generator which generates electric power using the waste heat energy of the low-temperature waste heat of about 300° C. or less by a Rankine cycle using a low-boiling working medium. Patent Document 2 shown below discloses a technology in which in a waste heat power generator using a Rankine cycle, part of liquid condensate of a working medium is guided to a cooler of a generator, to cool the generator using the evaporative latent heat of the working medium.

DOCUMENT OF RELATED ART

Patent Document

[Patent Document 1] Japanese Unexamined Patent Application, First Publication No. 2000-110514
[Patent Document 2] Japanese Patent Granted Publication No. 4286062

SUMMARY OF INVENTION

Technical Problem

Although the above Patent Document 2 discloses the technology of cooling the generator using the evaporative latent heat of the working medium used in the waste heat power generator, the cooling of the generator using this technology is not generally performed. Currently, the cooling of the generator is still performed generally using a cooling medium such as coolant.

In a case of cooling the generator used in the waste heat power generator, if the generator is excessively cooled by the cooling medium, the temperature of the generator drops, and the working medium which has been guided into the generator may be liquefied and gathered in the inside of the generator. In this case, the working medium (liquefied working medium) gathered in the generator may collide with a rotor (for example, a turbine rotor or a generator's rotor) of the generator, and thereby loss may be increased or mechanical breakage may be caused.

On the other hand, when the cooling of the generator using the cooling medium is insufficient, the temperature of a generator's casing, bearings which support a rotor, or the like may become high, and thereby malfunction such as seizing may be caused.

The present invention has been made in view of the above circumferences, and aims to provide a waste heat power generator capable of properly cooling a generator without causing excessive cooling or insufficient cooling.

Solution to Problem

In order to solve the above problems, according to a first aspect of the present invention, a waste heat power generator includes: an evaporator configured to collect waste heat energy and to produce steam of a working medium; a power-generating device configured to generate electric power while expanding the steam; a condenser configured to condense the steam which has passed through the power-generating device; and a pump configured to send the working medium condensed at the condenser, to the evaporator. The waste heat power generator further includes: a valve device configured to perform supply or supply stop of a cooling medium to the power-generating device, the cooling medium used to cool the power-generating device; and a controller configured to control the valve device based on a temperature of the power-generating device.

According to a second aspect of the present invention, in the first aspect, the controller controls the valve device based on the temperature of the power-generating device and on a pressure of the power-generating device.

According to a third aspect of the present invention, in the first aspect, the controller controls the valve device based on the temperature of the power-generating device and on an intermediate pressure between a pressure of steam supplied to the power-generating device and a pressure of steam released from the power-generating device.

According to a fourth aspect of the present invention, in any one of the first to third aspects, the controller controls the valve device so that the power-generating device is cooled to be a predetermined temperature and so that the steam produced at the evaporator is prevented from being liquefied inside the power-generating device.

According to a fifth aspect of the present invention, in the fourth aspect, the controller controls the valve device using information indicating a saturation property of the working medium.

According to a sixth aspect of the present invention, in any one of the first to fifth aspects, the cooling medium is part of a cooling medium used in the condenser in order to condense the steam which has passed through the power-generating device.

According to a seventh aspect of the present invention, in any one of the first to fifth aspects, the cooling medium is part of the working medium condensed at the condenser.

According to an eighth aspect of the present invention, in the seventh aspect, the working medium which has been used to cool the power-generating device is collected in the condenser.

Effects of Invention

According to the present invention, since a controller controls a valve device based on a temperature of a power-generating device, wherein the valve device performs supply or supply stop of a cooling medium used to cool the power-generating device, the power-generating device can be properly cooled without causing excessive cooling or insufficient cooling.

DESCRIPTION OF EMBODIMENTS

Hereinafter, waste heat power generators in embodiments of the present invention are described in detail with reference to the drawings.

First Embodiment

Figure 1:
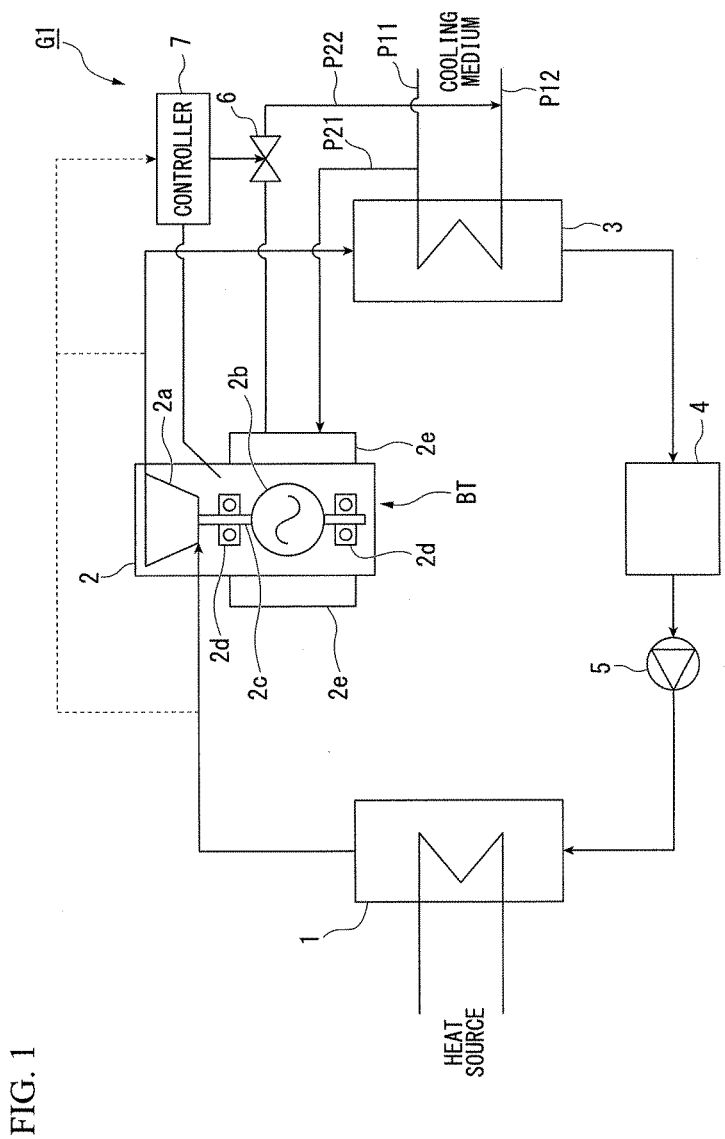
FIG. 1 is a block diagram schematically showing an overall configuration of a waste heat power generator in a first embodiment of the present invention.

FIG. 1 is a block diagram schematically showing an overall configuration of a waste heat power generator in a first embodiment of the present invention. As shown in FIG. 1, a waste heat power generator G1 of this embodiment includes an evaporator 1, an expansion turbine generator 2 (power-generating device), a condenser 3, a reservoir tank 4, a pump 5, a solenoid valve 6 (valve device), and a controller 7. The waste heat power generator G1 is a power generator using a Rankine cycle, and generates electric power using the waste heat energy of the low-temperature waste heat of about 300° C. or less (described as "heat source" in FIG. 1) released from a factory, an incineration facility, or the like.

The evaporator 1 recovers the low-temperature waste heat released from a factory or the like and produces the steam of a working medium. The expansion turbine generator 2 generates electric power while expanding the steam produced at the evaporator 1. The expansion turbine generator 2 includes, for example, an impeller 2a, a generator 2b, a rotary shaft 2c, bearings 2d, and a cooling jacket 2e. The expansion turbine generator 2 is disposed so that the axial direction of the rotary shaft 2c is parallel to the vertical direction (up-and-down direction).

The impeller 2a is a rotary vane which is rotationally driven by the steam produced at the evaporator 1. The generator 2b is driven using the rotational driving force of the impeller 2a, and produces electric power as, for example, three-phase AC. The rotary shaft 2c is a shaft member used to transmit the rotational driving force of the impeller 2a, to the generator 2b, and is rotatably supported by the bearings 2d so as to be parallel to the vertical direction (up-and-down direction). The cooling jacket 2e circulates a cooling medium (part of a cooling medium used in the condenser 3) in the expansion turbine generator 2.

The expansion turbine generator 2 includes a temperature sensor (not shown) which detects the internal temperature of the expansion turbine generator 2 and a pressure sensor (not shown) which detects the internal pressure of the expansion turbine generator 2. The temperature sensor and the pressure sensor are provided in, for example, a bottom portion BT (a lower portion in the vertical direction) of the expansion turbine generator 2.

In addition, instead of the above pressure sensor, a first pressure sensor and a second pressure sensor (they are not shown) may be provided, wherein the first pressure sensor detects the pressure of steam supplied to the expansion turbine generator 2 and the second pressure sensor detects the pressure of steam released from the expansion turbine generator 2, and the intermediate pressure therebetween may be derived from the detection results of the first and second pressure sensors. The internal pressure of the expansion turbine generator 2 generally becomes approximately equal to the intermediate pressure between the pressure of steam supplied to the expansion turbine generator 2 and the pressure of steam released therefrom. Therefore, the intermediate value between the detection results of the first and second pressure sensors may be used as the internal pressure of the expansion turbine generator 2.

The condenser 3 cools the steam which has passed through the expansion turbine generator 2, using the cooling medium such as coolant, so as to condense the steam (liquefaction). A pipe P11 and a pipe P12 are connected to the condenser 3, wherein the pipe P11 leads the cooling medium used to cool the working medium, to the condenser 3, and the pipe P12 leads the cooling medium which has been used to cool the working medium, to the outside of the condenser 3. Pipes P21 and P22 are connected to the pipes P11 and P12, respectively. The pipe P21 leads part of the cooling medium led to the condenser 3 through the pipe P11, to the cooling jacket 2e of the expansion turbine generator 2. The pipe 22 leads the cooling medium which has been circulated in the cooling jacket 2e, to the pipe 12.

The reservoir tank 4 is a tank which temporarily stores the working medium condensed at the condenser 3. The pump 5 pressures the working medium which is temporarily stored in the reservoir tank 4 after being condensed at the condenser 3, and sends the working medium to the evaporator 1.

The solenoid valve 6 is attached to the pipe P22 connected to the cooling jacket 2e of the expansion turbine generator 2 and to the pipe P12. The solenoid valve 6 opens or closes the passage of the pipe P22 under the control of the controller 7, and thereby performs supply or supply stop of the cooling medium to the expansion turbine generator 2. In addition, the solenoid valve 6 may be attached to the pipe P21 connected to the cooling jacket 2e and to the pipe P11.

The controller 7 controls the solenoid valve 6 based on the detection results of the temperature sensor (not shown) attached to the expansion turbine generator 2. In addition, the controller 7 may control the solenoid valve 6 based on the detection results of the above temperature sensor and on the detection results of the above pressure sensor. Furthermore, the controller may control the solenoid valve 6 based on the detection results of the above temperature sensor and on the intermediate pressure derived from the detection results of the first and second pressure sensors.

Specifically, the controller 7 controls the solenoid valve 6 based on the internal temperature, the internal pressure, the intermediate pressure, and the like of the expansion turbine generator 2, and regulates the supply amount of the cooling medium to the expansion turbine generator 2 so that the insufficient cooling to the expansion turbine generator 2 is not caused (that is, the expansion turbine generator 2 is cooled to be a predetermined temperature capable of preventing seizing or the like of the components thereof) and so that the steam supplied from the evaporator 1 is prevented from liquefied inside the expansion turbine generator 2.

The controller 7 performs the above control to the solenoid valve 6 using the information indicating a saturation property of the working medium. The information indicating the saturation property of the working medium is the information indicating the relationship between a temperature and a pressure in a state where the amount of the steam of the working medium to liquefy and the amount of the liquefied working medium to evaporate balance with each other.

That is, in order to prevent the working medium from liquefying inside the expansion turbine generator 2, the controller 7 controls the solenoid valve 6 which regulates the supply amount of the cooling medium, using the information indicating the saturation property of the working medium, so that the evaporation amount of the liquefied working medium is included within a range greater than the liquefaction amount of the steam of the working medium.

As the working medium used in the waste heat power generator G1 having the above configuration, a medium is preferably used in which its boiling point (a boiling point under the atmospheric pressure) is higher than 35° C. In this case, even if the low-temperature waste heat of about 300° C. or less is used, the steam of the working medium can be produced, and thus it is possible to generate electric power efficiently using the waste heat energy of such low-temperature waste heat. In addition, it is preferable that the maximum internal pressure of the device during operation be lower than or equal to 1 MPa (G) (1 MPa by the gauge pressure). In this case, by maintaining a low pressure in the entire device, it is possible to maintain a low internal pressure of the expansion turbine generator 2.

When a low internal pressure of the expansion turbine generator 2 is maintained, since high pressure is not applied to the casing of the expansion turbine generator 2, the evaporator 1, or the condenser 3, it is possible to ensure higher safety. In addition, since the strength of the above casing or the like does not have to be increased excessively, it is possible to obtain a synergistic effect of being capable of producing the device with low costs. As the above working medium, hydrofluoroether (HFE), fluorocarbon, fluoroketone, perfluoropolyether, or the like can be used.

In the waste heat power generator G1 having the above configuration, the pump 5 sends the liquid working medium to the evaporator 1, the working medium is boiled and evaporated through the waste heat energy of the low-temperature waste heat (heat source) supplied to the evaporator 1, and thereby the steam thereof is produced. The steam produced at the evaporator 1 is supplied to the expansion turbine generator 2, and drives the expansion turbine generator 2 while the steam is expanded, whereby the electric power generation is performed at the expansion turbine generator 2. The steam which has passed through the expansion turbine generator 2 is cooled at the condenser 3 by the cooling medium supplied through the pipe P11, and thereby is condensed (liquefaction). The working medium condensed by the condenser 3 is temporarily stored in the reservoir tank 4, and thereafter is pressured by the pump 5 so as to be sent to the evaporator 1 again. In this way, by repeating the evaporation and condensation of the working medium in the waste heat power generator G1, the electric power generation is performed using the waste heat energy of the low-temperature waste heat.

While the above operation is performed, the solenoid valve 6 is controlled by the controller 7 based on the detection results of the temperature sensor (not shown) attached to the expansion turbine generator 2 (or based on the detection results of the temperature sensor and on the detection results of the pressure sensor, or based on the detection results of the temperature sensor and on the detection results (the intermediate pressure) of the first and second pressure sensors), and the supply amount of the cooling medium to the expansion turbine generator 2 is regulated. In addition, the control to the solenoid valve 6 by the controller 7 is broadly classified into first control and second control, wherein the first control is only based on the temperature of the expansion turbine generator 2 and the second control is based on the temperature and the pressure (or the intermediate pressure) of the expansion turbine generator 2. Hereinafter, the first and second controls are described in detail.

(First Control)

Figure 2:
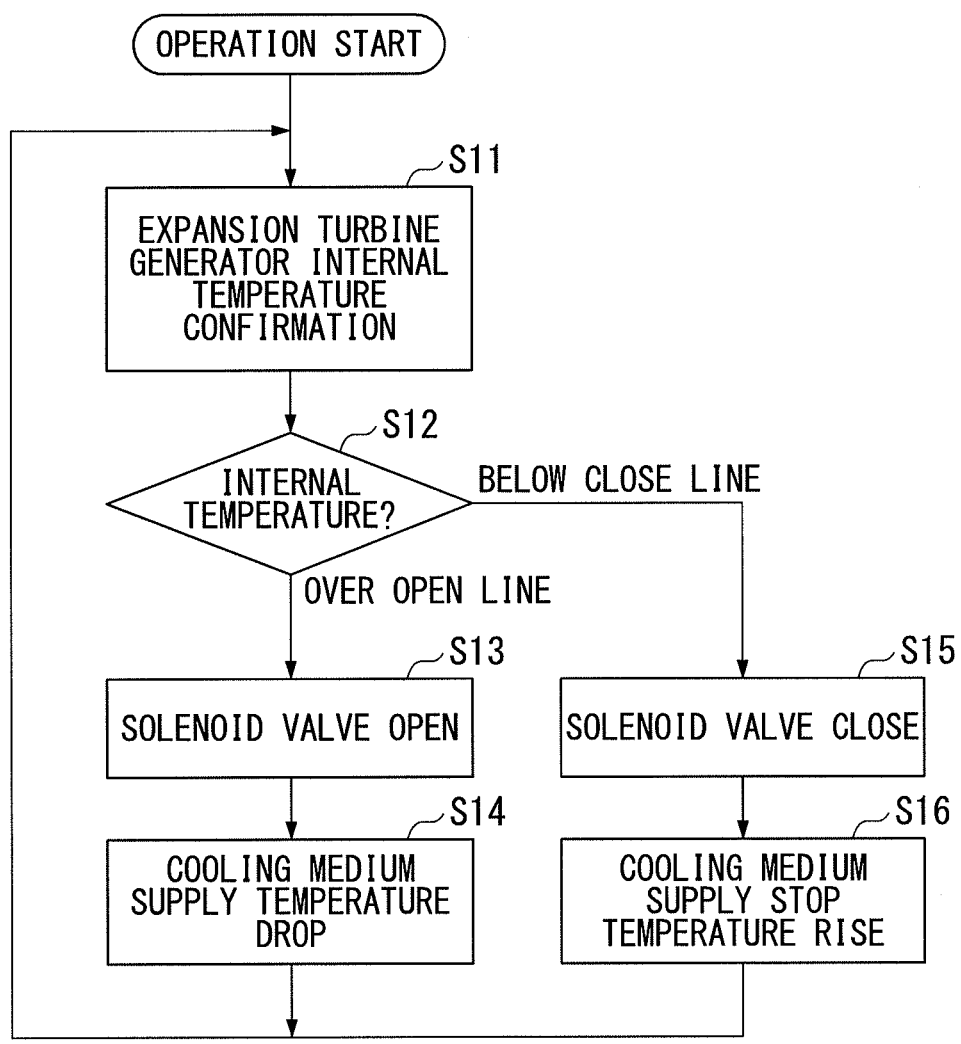
FIG. 2 is a flow diagram showing process of first control performed in the first embodiment of the present invention.
Figure 3:
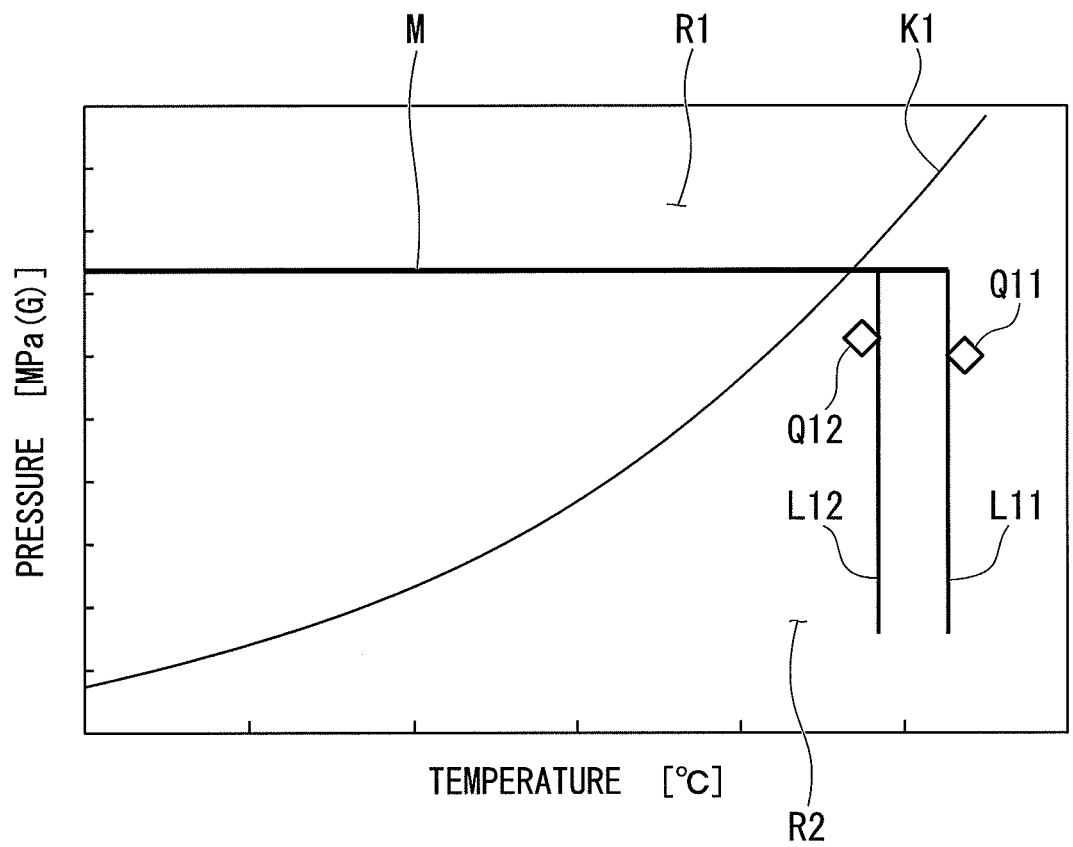
FIG. 3 is a diagram illustrating operation of the first control performed in the first embodiment of the present invention.

FIG. 2 is a flow diagram showing the process of the first control performed in the first embodiment of the present invention. FIG. 3 is a diagram illustrating the operation performed by the first control. In addition, FIG. 3 is a graph showing the saturation property of the working medium, the horizontal axis represents temperature, and the vertical axis represents pressure.

The curve denoted by a reference sign K1 in FIG. 3 is a curve (hereinafter referred to as "a saturation property curve") showing the relationship between a temperature and a pressure in a state where the amount of the steam of the working medium to liquefy and the amount of the liquefied working medium to evaporate balance with each other. The area R1 located upper than the saturation property curve K1 is an area in which the working medium exists as liquid, and the area R2 located lower than the saturation property curve K1 is an area in which the working medium exists as steam. In addition, the straight line denoted by a reference sign M in FIG. 3 shows the maximum pressure in the design of the expansion turbine generator 2.

In this first control, an open line L11 used to open the solenoid valve 6 and a close line L12 used to close the solenoid valve 6 are set. The first control is performed under the premise that the internal pressure of the expansion turbine generator 2 does not exceed the maximum pressure in the design thereof (the internal pressure is not over the straight line M). Therefore, the open line L11 is set as a straight line indicating a temperature at which the insufficient cooling to the expansion turbine generator 2 is not caused. The close line L12 is set as a straight line indicating a temperature at which the liquefaction of the working medium is not caused, wherein the temperature indicated by the close line L12 is less than the temperature indicated by the open line L11.

When the operation of the waste heat power generator G1 is started and the expansion turbine generator 2 starts generating electric power, the generator 2b generates heat due to, for example, electrical loss of the generator 2b

(copper loss, iron loss, or the like of a stator provided in the generator 2b). In addition, at the time of starting the operation of the waste heat power generator G1, since the temperature of the expansion turbine generator 2 is less than the temperature indicated by the close line L12, the solenoid valve 6 is closed. At an initial stage of the electric power generation by the expansion turbine generator 2, since the solenoid valve 6 is closed and the cooling medium is not led to the cooling jacket 2e of the expansion turbine generator 2, the internal temperature of the expansion turbine generator 2 is gradually increased.

The internal temperature of the expansion turbine generator 2 is detected by the temperature sensor (not shown), and the information indicating the detection results thereof is input into the controller 7. Thereby, the controller 7 confirms the internal temperature of the expansion turbine generator 2 (step S11). After this confirmation is carried out, the controller 7 determines whether the internal temperature of the expansion turbine generator 2 is greater than or equal to the open line L11 (the right side of the open line in FIG. 3) and whether the internal temperature thereof is less than or equal to the close line L12 (the left side of the close line in FIG. 3) (step S12).

For example, when the relationship between the temperature and pressure of the expansion turbine generator 2 is indicated by the point denoted by a reference sign Q11 in FIG. 3, the controller 7 determines that the internal temperature of the expansion turbine generator 2 is greater than or equal to the open line L11, and controls the solenoid valve 6 so as to open (step S13). Then, part of the cooling medium supplied through the pipe P11 is led through the pipe P21 to the cooling jacket 2e of the expansion turbine generator 2. The cooling medium is circulated in the cooling jacket 2e, and thereby the expansion turbine generator 2 is cooled so that the temperature thereof drops (step S14). Thereby, the seizing or the like due to the insufficient cooling to the expansion turbine generator 2 is prevented. In addition, the cooling medium which has been circulated in the cooling jacket 2e is led through the pipe P22 to the pipe P12.

For example, when the relationship between the temperature and pressure of the expansion turbine generator 2 is indicated by the point denoted by a reference sign Q12 in FIG. 3, the controller 7 determines that the internal temperature of the expansion turbine generator 2 is less than or equal to the close line L12, and controls the solenoid valve 6 so as to close (step S15). Then, the supply of the cooling medium through the pipe P21 to the cooling jacket 2e of the expansion turbine generator 2 is stopped, and the temperature of the expansion turbine generator 2 rises (step S16). Thereby, the liquefaction of the working medium due to the excessive cooling to the expansion turbine generator 2 is prevented.

In this way, in this first control, when the temperature of the expansion turbine generator 2 is greater than or equal to the open line L11, the controller 7 opens the solenoid valve 6, and thereby the supply of the cooling medium to the expansion turbine generator 2 is performed. On the other hand, when the temperature of the expansion turbine generator 2 is less than or equal to the close line L12, the controller 7 closes the solenoid valve 6, and thereby the supply of the cooling medium to the expansion turbine generator 2 is stopped. Thereby, the temperature of the expansion turbine generator 2 is maintained between the temperature indicated by the open line L11 and the temperature indicated by the close line L12, and the expansion turbine generator 2 can be properly cooled without causing excessive cooling or insufficient cooling.

(Second Control)

Figure 4:
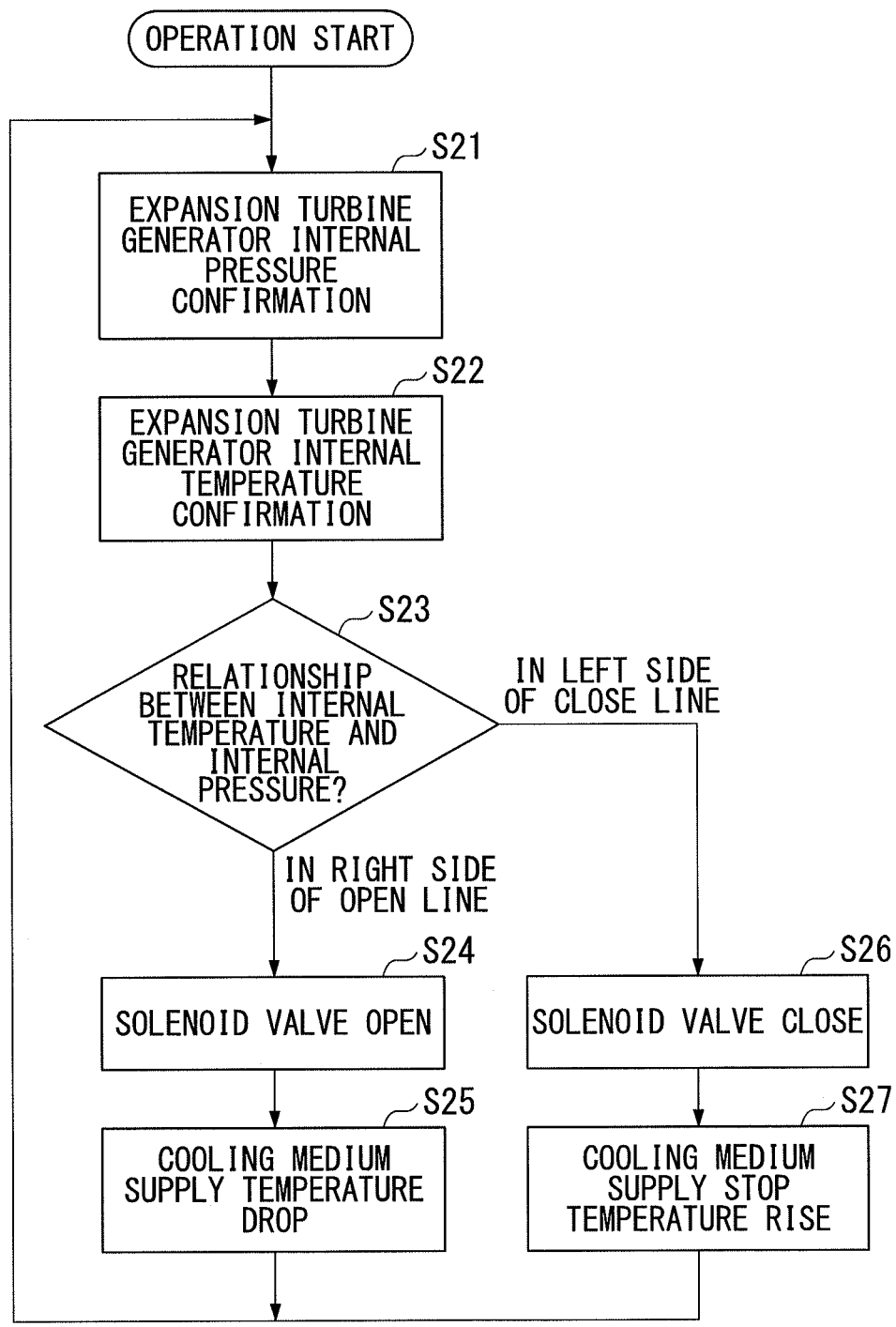
FIG. 4 is a flow diagram showing process of second control performed in the first embodiment of the present invention.
Figure 5:
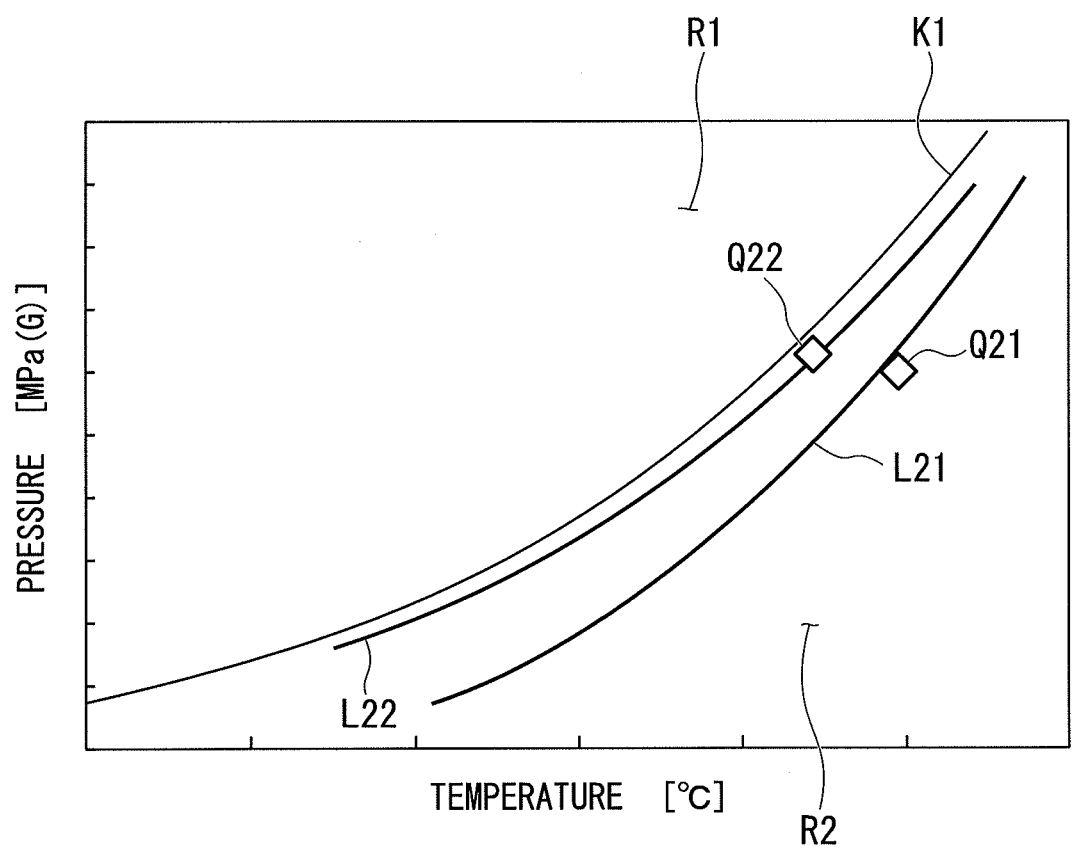
FIG. 5 is a diagram illustrating operation of the second control performed in the first embodiment of the present invention.

FIG. 4 is a flow diagram showing the process of the second control performed in the first embodiment of the present invention. FIG. 5 is a diagram illustrating the operation performed by the second control. In addition, FIG. 5 is a graph showing the saturation property of the working medium similarly to the graph shown in FIG. 3, and the area R1 in which the working medium exists as liquid and the area R2 in which the working medium exists as steam are shown therein.

In this second control, an open line L21 used to open the solenoid valve 6 and a close line L22 used to close the solenoid valve 6 are also set. In addition, unlike the first control, the second control is performed using the temperature and the pressure (or the intermediate pressure) of the expansion turbine generator 2. Therefore, the open line L21 is set as a curve (a curve approximately along the saturation property curve K1) indicating the relationship between a temperature and a pressure at which the insufficient cooling to the expansion turbine generator 2 is not caused. The close line L22 is set between the open line L21 and the saturation property curve K1, and is set as a curve (a curve approximately along the saturation property curve K1) indicating the relationship between a temperature and a pressure at which the liquefaction of the working medium is not caused.

When the operation of the waste heat power generator G1 is started and the expansion turbine generator 2 starts generating electric power, similarly to the case described in the first control, the internal temperature of the expansion turbine generator 2 is gradually increased.

The internal pressure (or the intermediate pressure) of the expansion turbine generator 2 is detected by the pressure sensor (not shown), and the information indicating the detection results thereof is input into the controller 7. Thereby, the controller 7 confirms the internal pressure (or the intermediate pressure) of the expansion turbine generator 2 (step S21).

The internal temperature of the expansion turbine generator 2 is detected by the temperature sensor (not shown), and the information indicating the detection results thereof is input into the controller 7. Thereby, the controller 7 confirms the internal temperature of the expansion turbine generator 2 (step S22).

After the above confirmations are carried out, the controller 7 determines the relationship between the internal temperature and the internal pressure of the expansion turbine generator 2, and the open line L21 and the close line L22 (step S23). That is, the controller 7 determines whether the internal temperature of the expansion turbine generator 2 is greater than or equal to the temperature indicated by the open line L21 and whether the internal pressure of the expansion turbine generator 2 is less than or equal to the pressure indicated by the open line L21. In addition, the controller 7 determines whether the internal temperature of the expansion turbine generator 2 is less than or equal to the temperature indicated by the close line L22 and whether the internal pressure of the expansion turbine generator 2 is greater than or equal to the pressure indicated by the close line L22. Furthermore, if it is described with reference to FIG. 5, the controller 7 determines whether the internal temperature and the internal pressure of the expansion turbine generator 2 are positioned in the right side (lower side) of the open line L21 in FIG. 5, and whether the internal temperature and the internal pressure thereof are positioned in the left side (upper side) of the close line L22 in FIG. 5.

For example, when the relationship between the temperature and pressure of the expansion turbine generator 2 is indicated by the point denoted by a reference sign Q21 in FIG. 5, the controller 7 determines that the relationship between the internal temperature and the internal pressure of the expansion turbine generator 2 is positioned in the right side of the open line L21 and controls the solenoid valve 6 so as to open (step S24). Then, part of the cooling medium supplied through the pipe P11 is led through the pipe P21 to the cooling jacket 2e of the expansion turbine generator 2. The cooling medium is circulated in the cooling jacket 2e, and thereby the expansion turbine generator 2 is cooled so that the temperature thereof drops (step S25). Thereby, the seizing or the like due to the insufficient cooling to the expansion turbine generator 2 is prevented. In addition, the cooling medium which has been circulated in the cooling jacket 2e is led through the pipe P22 to the pipe P12.

For example, when the relationship between the temperature and pressure of the expansion turbine generator 2 is indicated by the point denoted by a reference sign Q22 in FIG. 5, the controller 7 determines that the relationship between the internal temperature and the internal pressure of the expansion turbine generator 2 is positioned in the left side of the close line L22 and controls the solenoid valve 6 so as to close (step S26). Then, the supply of the cooling medium through the pipe P21 to the cooling jacket 2e of the expansion turbine generator 2 is stopped, and the temperature of the expansion turbine generator 2 rises (step S27). Thereby, the liquefaction of the working medium due to the excessive cooling to the expansion turbine generator 2 is prevented.

In this way, in this second control, the control to the solenoid valve 6 is performed in view of the relationship between the temperature and pressure of the expansion turbine generator 2. Specifically, when the relationship between the temperature and pressure of the expansion turbine generator 2 is positioned in the right side of the open line L21, the controller 7 opens the solenoid valve 6, and thereby the supply of the cooling medium to the expansion turbine generator 2 is performed. On the other hand, when the relationship between the temperature and pressure of the expansion turbine generator 2 is positioned in the left side of the close line L22, the controller 7 closes the solenoid valve 6, and thereby the supply of the cooling medium to the expansion turbine generator 2 is stopped.

Thereby, the temperature of the expansion turbine generator 2 is maintained between the temperature indicated by the open line L21 and the temperature indicated by the close line L22, and the expansion turbine generator 2 can be properly cooled without causing excessive cooling or insufficient cooling. In addition, by considering the internal pressure (or the intermediate pressure) of the expansion turbine generator 2 in addition to the internal temperature thereof, the internal temperature of the expansion turbine generator 2 can be held at a lower temperature than the case of the first control, and the expansion turbine generator 2 can be operated more stably.

Second Embodiment

Figure 6:
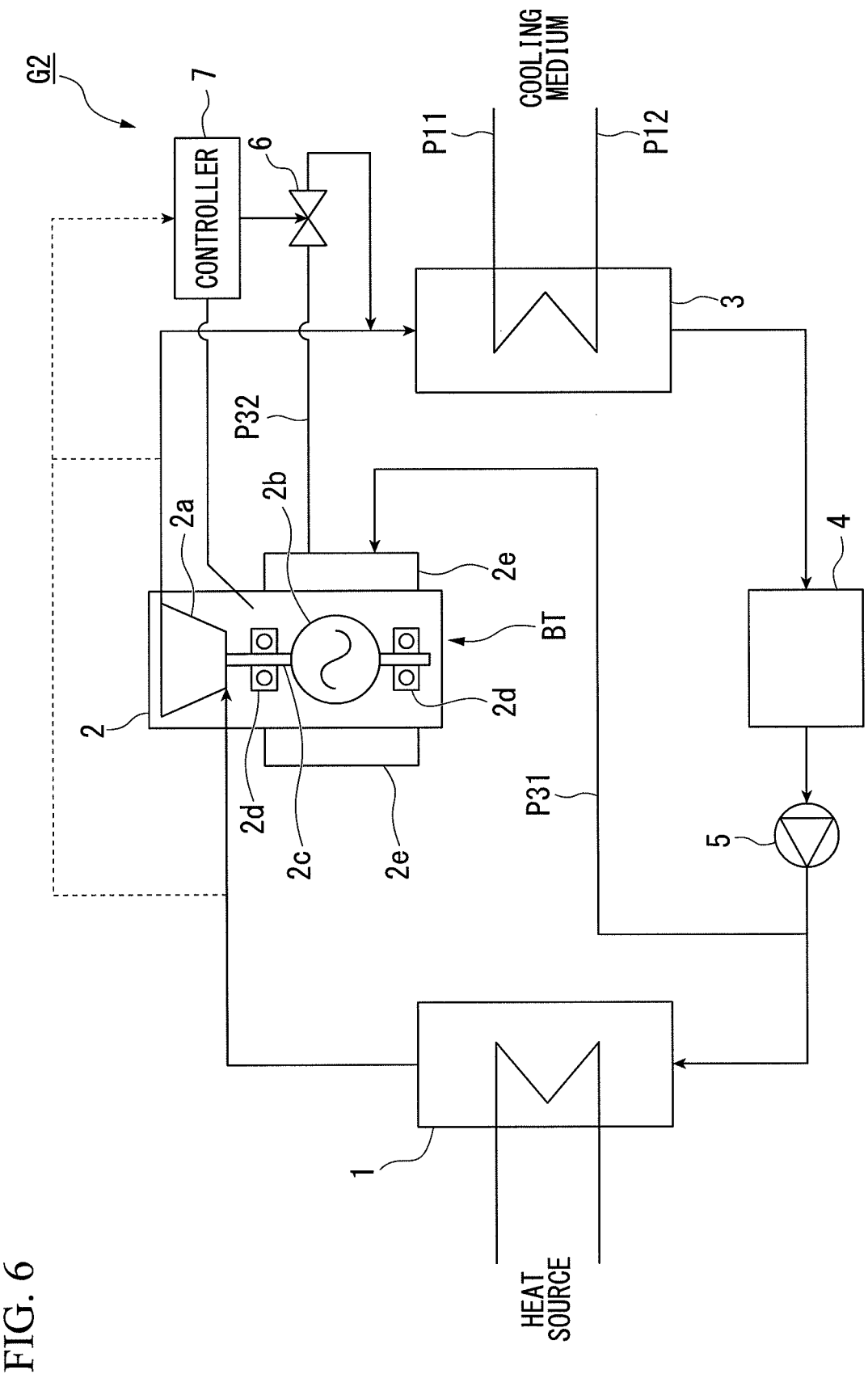
FIG. 6 is a block diagram schematically showing an overall configuration of a waste heat power generator in a second embodiment of the present invention.

FIG. 6 is a block diagram schematically showing an overall configuration of a waste heat power generator in a second embodiment of the present invention. As shown in FIG. 6, the waste heat power generator G2 in this embodiment includes the components from the evaporator 1 to the controller 7, similarly to the waste heat power generator G1 in the first embodiment shown in FIG. 1. The waste heat power generator G2 is a power generator using a Rankine cycle, and generates electric power using the waste heat energy of the low-temperature waste heat of about 300° C. or less released from a factory, an incineration facility, or the like. In addition, the waste heat power generator G2 in this embodiment differs from the waste heat power generator G1 in the first embodiment shown in FIG. 1, in that the expansion turbine generator 2 is cooled using a working medium.

Specifically, in the waste heat power generator G2 in this embodiment, the pipes P21 and P22 (pipes which are connected to the pipes P11 and P12 connected to the condenser 3, and which are connected to the cooling jacket 2e of the expansion turbine generator 2) provided in the waste heat power generator G1 are not provided, and pipes P31 and P32 are provided. The pipe P31 leads part of the working medium sent from the pump 5 to the evaporator 1, to the cooling jacket 2e of the expansion turbine generator 2. The pipe P32 leads the cooling medium (working medium) which has been circulated in the cooling jacket 2e, to the condenser 3. The solenoid valve 6 is attached to the pipe P32. In addition, the solenoid valve 6 may be attached to the pipe P31.

The waste heat power generator G2 having the above configuration differs from the waste heat power generator G1 in the first embodiment, only in that the expansion turbine generator 2 is cooled using the working medium, and the control to the solenoid valve 6 by the controller 7 is performed similarly to the waste heat power generator G1 in the first embodiment. Therefore, in this embodiment, the expansion turbine generator 2 can be properly cooled without causing excessive cooling or insufficient cooling.

Hereinbefore, the waste heat power generators in the embodiments of the present invention are described, but the present invention is not limited to the above embodiments and is limited only to the scope of the attached claims. A shape, a combination or the like of each component shown in the above embodiments is illustrative only, and additions, omissions, substitutions, or other modifications to the configuration can be adopted within the scope not departing from the gist of the present invention.

For example, in the above embodiments, the reservoir tank 4 is provided between the condenser 3 and the pump 5, but if it is not necessary, the reservoir tank 4 can be omitted. In addition, in the above embodiments, the solenoid valve 6 is used as the valve device, but a valve other than a solenoid valve (for example, a mechanical valve device) can be employed. Furthermore, the present invention can be applied to a structure of using a radial turbine generator such as a centrifugal expansion turbine generator or a diagonal flow expansion turbine generator as the power-generating device.

INDUSTRIAL APPLICABILITY

The present invention can be widely applied to a waste heat power generator which generates electric power using waste heat energy.

DESCRIPTION OF REFERENCE SIGNS

1 Evaporator
2 Expansion turbine generator (power-generating device)
3 Condenser
5 Pump
6 Solenoid valve (valve device)
7 Controller
G1, G2 Waste heat power generator

The invention claimed is:

1. A waste heat power generator comprising:
an evaporator configured to produce steam of a working medium;
an expansion turbine generator coupled to the evaporator and including an impeller, a rotary shaft supported by bearings, and a generator, a temperature sensor being provided therewith, and the steam of the working medium being input thereinto through a supply line between the evaporator and the expansion turbine generator;
a pipe different from the supply line between the evaporator and the expansion turbine generator, the pipe leading cooling medium to the expansion turbine generator;
a valve coupled to the expansion turbine generator through the pipe; and
a controller coupled to the valve and the temperature sensor to control supplying the cooling medium to the expansion turbine generator based on temperature of the expansion turbine generator,
wherein the controller controls the valve so that the steam of the working medium from the evaporator is prevented from being liquefied inside the expansion turbine generator.

2. The waste heat power generator according to claim 1, wherein
the controller controls the valve based on the temperature and pressure of the expansion turbine generator.

3. The waste heat power generator according to claim 2, wherein the controller is configured to control the valve so that:
when the temperature of the expansion turbine generator is equal to or greater than a temperature indicated by a predetermined open line, which is set as a curve indicating a relationship between a temperature and a pressure at which insufficient cooling to the expansion turbine generator is not caused, and the pressure of the expansion turbine generator is equal to or less than a pressure indicated by the open line, the valve is opened; and
when the temperature of the expansion turbine generator is equal to or less than a temperature indicated by a predetermined close line, which is set as a curve indicating a relationship between a temperature and a pressure at which liquefaction of the working medium is not caused, the close line being set between the open line and a saturation property curve showing a relationship between a temperature and a pressure in a state where an amount of the steam of the working medium to liquefy and an amount of the liquefied working medium to evaporate balance with each other, and the pressure of the expansion turbine generator is equal to or greater than a pressure indicated by the close line, the valve is closed.

4. The waste heat power generator according to claim 1, further comprising a first pressure sensor that detects a pressure of the steam supplied to the expansion turbine generator and a second pressure sensor that detects a pressure of the steam released from the expansion turbine generator,
wherein the controller controls the valve based on the temperature thereof and on intermediate pressure between pressure of the steam of the working medium supplied to the expansion turbine generator and pressure of steam released from the expansion turbine generator.

5. The waste heat power generator according to claim 1, wherein the controller controls the valve based on information indicating a saturation property of the working medium.

6. The waste heat power generator according to claim 1, further comprising a condenser coupled between the power generator and the evaporator to receive coolant, which is used to cool the steam of the working medium from the expansion turbine generator, and to condense the working medium from the expansion turbine generator,
wherein the cooling medium is part of the coolant.

7. The waste heat power generator according to claim 1, further comprising a condenser coupled between the expansion turbine generator and the evaporator to condense the working medium from the expansion turbine generator,
wherein the cooling medium is part of a condensed working medium from the condenser.

8. The waste heat power generator according to claim 7, wherein the cooling medium from the condenser is input to the condenser after passing through the expansion turbine generator and cooling the expansion turbine generator.

9. The waste heat power generator according to claim 1, wherein the controller is configured to control the valve so that:
when the temperature of the expansion turbine generator is equal to or greater than a predetermined open line, which is set as a straight line indicating a temperature at which insufficient cooling to the power generator is not caused, the valve is opened; and
when the temperature of the expansion turbine generator is equal to or less than a predetermined close line, which is set as a straight line indicating a temperature at which liquefaction of the working medium is not caused, the temperature of the close line being less than the temperature indicated by the open line, the valve is closed.

* * * * *